United States Patent
Hong et al.

(10) Patent No.: US 9,155,365 B2
(45) Date of Patent: Oct. 13, 2015

(54) METHOD FOR SUBLIMATING AN IMAGE ONTO A SUBSTRATE

(71) Applicant: Uncommon LLC, Chicago, IL (US)

(72) Inventors: John Hong, Chicago, IL (US); Scott Wilson, Chicago, IL (US); Dustin Brown, Chicago, IL (US); Jon Godston, Chicago, IL (US)

(73) Assignee: Uncommon LLC, Chicago, IL (US)

( * ) Notice: Subject to any disclaimer, the term of this patent is extended or adjusted under 35 U.S.C. 154(b) by 496 days.

(21) Appl. No.: 13/648,693

(22) Filed: Oct. 10, 2012

(65) Prior Publication Data

US 2013/0032049 A1 Feb. 7, 2013

Related U.S. Application Data

(63) Continuation-in-part of application No. 12/855,311, filed on Aug. 12, 2010, now Pat. No. 8,286,789.

(60) Provisional application No. 61/233,146, filed on Aug. 12, 2009.

(51) Int. Cl.
| | |
|---|---|
| *B29C 65/00* | (2006.01) |
| *B44C 1/165* | (2006.01) |
| *B44C 1/17* | (2006.01) |
| *A45C 11/00* | (2006.01) |
| *B41M 5/035* | (2006.01) |
| *B41M 5/382* | (2006.01) |
| *B44C 1/16* | (2006.01) |
| *B28B 11/00* | (2006.01) |
| *B41M 5/52* | (2006.01) |
| *B41M 5/41* | (2006.01) |
| *A45C 13/08* | (2006.01) |

(52) U.S. Cl.
CPC ............... *A45C 11/00* (2013.01); *B28B 11/001* (2013.01); *B41M 5/035* (2013.01); *B41M 5/382* (2013.01); *B44C 1/16* (2013.01); *B44C 1/165* (2013.01); *B44C 1/1712* (2013.01); *A45C 13/08* (2013.01); *A45C 2011/002* (2013.01); *B41M 5/41* (2013.01); *B41M 5/52* (2013.01)

(58) Field of Classification Search
CPC ........... B41M 5/0082; B41M 5/38221; B41M 5/38207; B41M 5/41; B41M 5/035; B41M 5/52; B41M 5/382; B44C 1/1712; B44C 1/16; B44C 1/165; B28B 11/001
See application file for complete search history.

(56) References Cited

U.S. PATENT DOCUMENTS

| | | | | |
|---|---|---|---|---|
| 5,487,614 | A * | 1/1996 | Hale | 400/120.02 |
| 6,964,722 | B2 * | 11/2005 | Taylor et al. | 156/230 |
| 7,100,341 | B2 * | 9/2006 | McIlvaine | 52/745.2 |
| 2005/0266204 | A1 * | 12/2005 | Abrams | 428/90 |

\* cited by examiner

*Primary Examiner* — Alex Efta
(74) *Attorney, Agent, or Firm* — Bishop Diehl & Lee, Ltd.

(57) ABSTRACT

A method for applying an image onto a surface (or substrate) of most any material, including thermoplastic, thermoset plastic, metal, metal alloys, wood, cellulose material, polymer, synthetic fabric, natural fabric, glass, ceramic, and combinations thereof, includes the steps of preparing a substrate for application of an image, placing the transfer sheet onto the prepared substrate, applying heat to the substrate and image sufficient to sublimate the image, allowing the image to absorb into the prepared substrate, and then curing the imaged substrate. Multiple substrates may be individually imaged and joined, if desired. One or more of the substrates may be at least partially transparent (e.g., clear, transparent or translucent) such that portions of other images, substrates or objects placed behind the one or more substrates are at least partially visible through the one or more substrates.

22 Claims, 2 Drawing Sheets

METHOD FOR SUBLIMATING AN IMAGE ONTO A SUBSTRATE

RELATED APPLICATIONS

The present application is a continuation-in-part of and claims filing priority to U.S. application Ser. No. 12/855,311, titled "Two-Piece Protective Carrying Case," filed Aug. 12, 2010 and now U.S. Pat. No. 8,286,789 which in turn claims priority of Provisional Application No. 61/233,146, filed on Aug. 12, 2009. Both the '311 application and the '146 Provisional application are incorporated herein by reference in their entirety.

TECHNICAL FIELD

The present invention relates to methods for applying an image to a substrate, such as a case for an electronic device, and more specifically to a method for sublimating the image onto the substrate to ensure high-quality permanent retention of the image.

BACKGROUND OF THE INVENTION

Previously, to produce items having an image disposed on one or both sides of the item, using a plastic or other suitable material, required the use of different and multiple processes. For example, a sheet of material or fluid material from which an item was to be formed might be initially positioned within or directed into an injection or compression molding device in order to create detail or features required on at least one side of the item. Subsequently, the material sheet would then be positioned or run through a suitable second thermoforming device to complete the formation of the item from the material. The resulting thermoformed item might then be heat treated under vacuum conditions with a dye printing sheet to print a selected pre-drawn design or image onto a surface of the item.

However, these multi-step processes have a number of significant drawbacks. First, the added steps typically slow production time and increase production cost. Second, subjecting the item to repeated high-temperature steps can have a detrimental effect on the item. Additionally, such printing was traditionally applicable to a limited number of suitable materials, such as thermoplastics, metals, and the like with a smooth, non-textured surface.

As to the first point, to initially print the detailed design on an item, the process may require both a detail molding device and step, which can be either an injection molding step or a compression molding step, as well as a final thermoforming step (e.g., melting or sublimation techniques) used to create the final form for the item. Finally, the pre-drawn design needs to be imprinted to the item. The multiple steps and molding devices required for each step significantly increases the complexity of the process and the costs for producing the final item with an image or design printed thereon.

Of no less importance is the integrity of the final item. That is, when a sheet of material is positioned within the heat treatment device to finalize the transfer of the dye printing onto the item, often times the process results in a partial or complete deformation or destruction of the original detail from the initial thermoforming steps. That is, due to the repeated use of high-temperatures necessary to initiate transfer of the dye from a pre-printed film to one or both sides of the thermoformed item, the edges around the item may be unable to withstand such heat for the required duration of the transfer process. However, shortened heat transfer times would fail to ensure consistent transfer of the dye on the entire surface of the item. Thus, the resulting item may often be undesirable or unusable for its intended purpose due to the damage done to the thermoform details on the item.

Finally, the use of materials which are not traditionally suitable for printing, such as wood, rubber, cellulosic material, and the like, require attachment of labels, tags or other similar devices. Even thermoplastic materials with textured surfaces may present difficulties for printing operations.

Therefore, it is desirable to develop a method for effectively transferring an image from a printing sheet to a surface of an item made from most any material and in a single heat transfer step.

SUMMARY OF THE INVENTION

There is disclosed herein an improved method for applying an image to a substrate of most any material (e.g., plastic, metal, wood, etc.) which avoids the disadvantages of prior methods while affording additional advantages.

Generally speaking, the method for applying an image onto a surface (or substrate) comprising the steps of preparing a substrate for application of an image, placing the transfer sheet onto the prepared substrate, applying heat to the substrate and image sufficient to sublimate the image, allowing the image to absorb into the prepared substrate, and then curing the imaged substrate. Multiple substrates may be individually imaged and joined, if desired.

Preferably, the step of preparing a first substrate comprises the step of applying a liquid adhesion material to a surface of the first substrate. The liquid adhesion material facilitates in the absorption process. The image may be used to conceal manufacturing or other defects in the substrate.

The substrate may be comprised substantially of most any material. Particularly, the material is selected from the group consisting of thermoplastic, thermoset plastic, metal, metal alloys, wood, cellulose material, polymer, synthetic fabric, natural fabric, glass, ceramic, and combinations thereof.

These and other aspects of the invention can be more readily understood from a reading of the following detailed description accompanied by the appended drawing figures.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

DETAILED DESCRIPTION OF THE INVENTION

Figure 1:
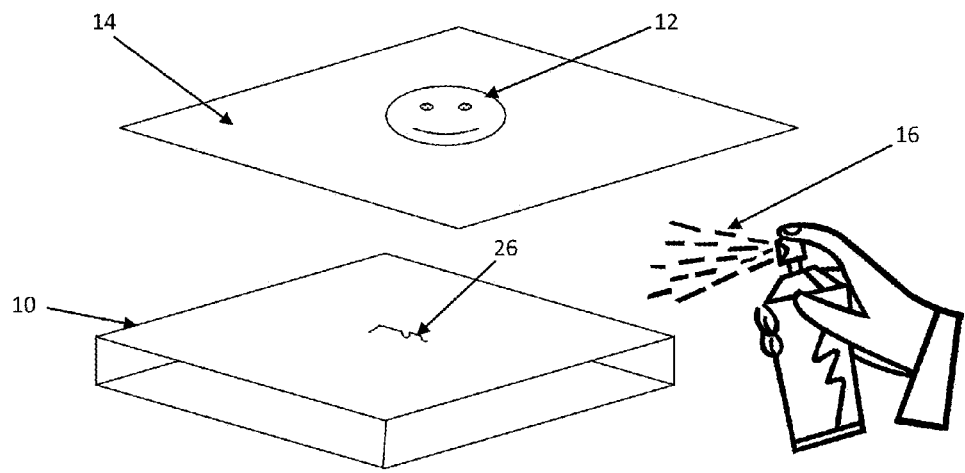
FIG. 1 is a perspective view illustrating initial steps of an embodiment of the described method.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-5, there is illustrated an embodiment of a method for applying an image to a substrate, generally designated by the number 10. The particular illustrated embodiment of a substrate 10 is representative of a flat, planar, non-textured surface. However, the particular substrate 10 may be configured in any number of sizes, shapes and even textures, and may be comprised of most any known material. Those skilled in the relevant art will be able to understand and provide the required design changes to accommodate such alternate substrates after a reading of the present detailed disclosure, including the appended drawing figures, without need for undue experimentation.

Reference numbers used within FIGS. 1-5 and in the detailed description to follow, correspond as shown to the following elements:

| Reference Number | Element |
| --- | --- |
| 10 | substrate; |
| 12, 112 | image; |
| 14 | transfer sheet; |
| 16 | adhesion liquid; |
| 18 | heat source; |
| 20 | imaged substrate; |
| 22 | subsequent substrate; |
| 24 | multi-substrate device; and |
| 26 | defect or imperfection. |

With reference to the illustrated embodiments, a first substrate 10 includes at least one surface for applying an image 12. The image 12 may initially be provided on a transfer sheet 14 to facilitate placement of the image 12 on the substrate 10. The substrate 10 is preferably comprised substantially of a material selected from thermoplastic, thermoset plastic, metal, metal alloys, wood, cellulose material, polymer, synthetic fabric, natural fabric, glass, ceramic, and combinations thereof. By "substantially" it is meant that the material is a major component of the substrate composition.

In various exemplary embodiments, the substrate 10 is at least partially comprised of a clear, transparent or translucent material. For example, in one such exemplary embodiment, the substrate 10 may be clear plastic, such as a clear thermoplastic. Likewise, in various exemplary embodiments, the image 12 may include clear, transparent, or translucent sections or portions. It should be appreciated that in embodiments utilizing an image 12 with one or more clear, transparent or translucent sections or portions, the portion or section of the substrate 10 aligned with the clear, transparent or translucent sections or portions of the image 12 will be at least partially visible through the image 12. Likewise in embodiments that utilize a clear, transparent or translucent substrate 10, a surface that is behind or underneath the substrate, including another substrate, will be at least partially visible through the substrate 10.

Figure 2:
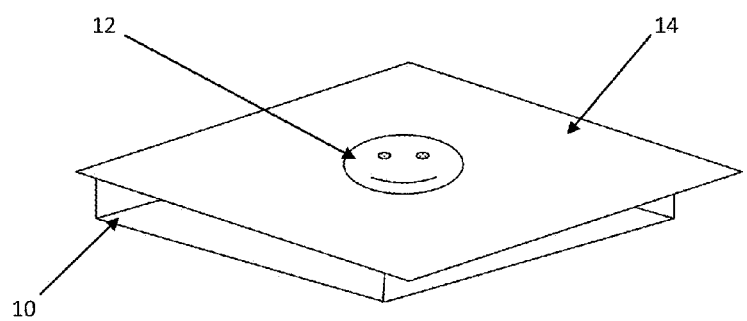
FIG. 2 is a perspective view illustrating positioning steps of an embodiment of the described method.

The surface of the substrate 10 is first prepared for application of the image 12. In a preferred embodiment, the preparation is carried out by the application of a liquid adhesive or bonding agent 16 to the substrate surface, as illustrated in FIG. 1. The preparation of the surface may be done manually or automatically where mass production of product occurs. Once the substrate 10 is properly prepared, the image 12, via the transfer sheet 14, is positioned onto the substrate 10, as shown in FIG. 2. The transfer sheet 14 may be smaller than the substrate 10 leaving a portion of the substrate uncovered, larger than the substrate 10, or the same size as the substrate 10. If the substrate 10 should include a defect or imperfection 26 (FIG. 1), from manufacturing or by some other means, the image 12 may be positioned over the defect or imperfection 26.

Figure 3:
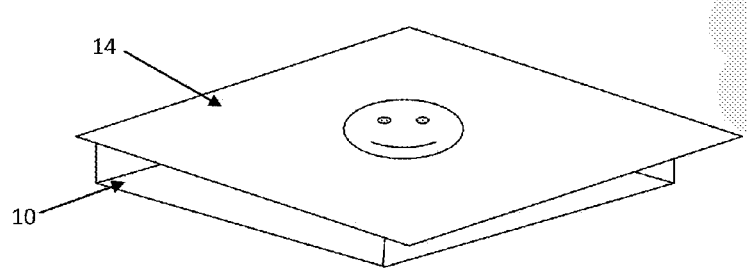
FIG. 3 is a perspective view illustrating heating steps of an embodiment of the described method.

Once positioned, the image 12 and the substrate 10 are subjected to a heat source 18, as illustrated in FIG. 3. The heat source 18 is used to bring the image to a sublimation temperature, preferably below the point of damaging the substrate 10. The duration of the sublimation process may vary widely. Those skilled in the art would be able to determine a suitable heat temperature as well as a suitable exposure time to achieve the desired sublimation.

Figure 4:
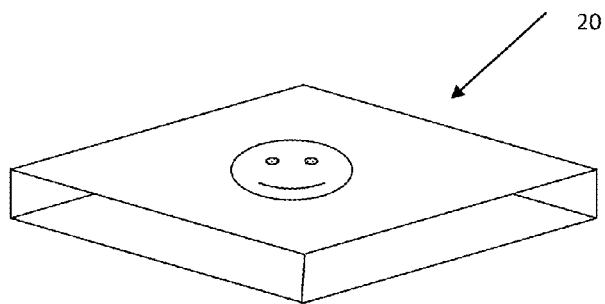
FIG. 4 is a perspective view illustrating a final imaged product made in accordance with an embodiment of the described method.
Figure 5:
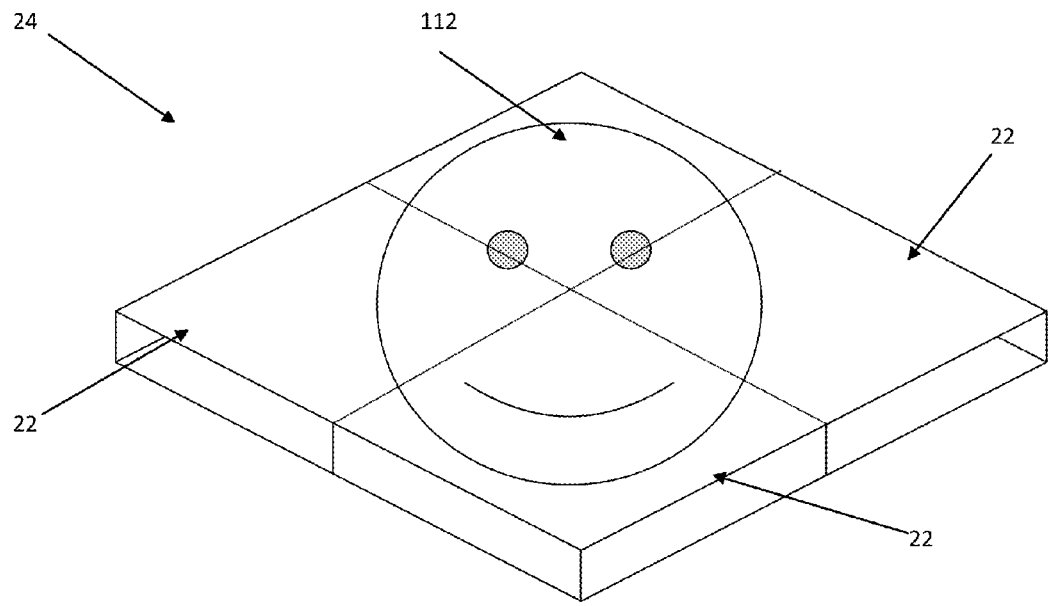
FIG. 5 is a perspective view illustrating a plurality of substrates together to form a continuous image.

After sublimating the image to be absorbed into the prepared surface of the substrate 10, the imaged substrate 20 is allowed to cure. Cooling of the imaged substrate 20 is also achieved during this time. The final imaged substrate 20 is illustrated in FIG. 4. In some instances an image 112 may be larger than a single substrate 10, so subsequent substrates 22 are used. Preferably, the image 112 is divided into sub-parts which, following the steps outlined above, are properly align on each of the substrates so that when attached together in a multiple-substrate device 24, as illustrated in FIG. 5, the complete image is displayed.

In various exemplary embodiments, the image 112 may be divided into sub-parts intended to be placed on a first substrate 10 and one or more subsequent substrates 22 that are placed on top of or beneath, as opposed to adjacent, the first substrate 10. In such exemplary embodiments, the first substrate and/or one or more of the one or more subsequent substrates 22 may be at least partially comprised of a clear, transparent or translucent material. The first substrate and any subsequent substrates may be either comprised of the same material or different materials, as desired. Likewise, in various exemplary embodiments, the image 112 may include one or more clear, transparent or translucent sections or portions. It should be appreciated that where the image 112 is clear, transparent or translucent, the substrate on which the image is placed, such as the first substrate 10 or the one or more subsequent substrates 22, will be at least partially visible through or around the image 112. Likewise, where one substrate, such as the first substrate 10, is clear, transparent or translucent, any other substrate placed beneath that one substrate, such as the one or more subsequent substrates 22, will be at least partially visible through the one substrate.

It should be appreciated that by varying the transparency, thickness, positioning and order of the various substrates and images described above, a three-dimensional image or effect can be created. For example, by transferring a portion of an image to a first substrate comprised of a clear thermoplastic and placing that substrate in front of another object, the portion of the image transferred to the first substrate will appear to be spaced a distance from the object. By varying the thickness of the substrate, the relative distance between the portion of the image and the object can be varied.

Likewise, by transferring a second portion of the image to a second substrate and positioning the first substrate in front of the second substrate the first portion of the image will appear to be spaced a distance from the second portion. Similarly, the first imaged substrate may be aligned with an object such that at least a portion of the object is visible through the first imaged substrate. Again, by varying the thickness of the first substrate, the relative distance between the first and second portions of the image can also be varied. Multiple substrates, images, portions of images and objects can be oriented in this manner to place the images or portions of images in different three-dimensional orientations.

Further, in multiple substrate embodiments, the application of heat to the first and any subsequent substrates and the subsequent curing of these substrates are preferably performed concurrently. Also, aligning of the first substrate with any subsequent substrate is preferably performed before applying heat to either substrate. However, attaching the first substrate to any subsequent substrate is performed concurrently with the application of heat to the substrates, which serves to bond the substrates to each other.

It should be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for applying a three-dimensional image onto a substrate, the method comprising the steps of:
    preparing a first substrate for application of a first layer of an image printed on a first transfer sheet, the first substrate comprising a material that is at least partially transparent;
    placing the first transfer sheet onto the prepared first substrate such that the first layer of the image contacts the first substrate and is aligned with a desired position on the first substrate;
    preparing a subsequent substrate for application of a subsequent layer of the image printed on a subsequent transfer sheet;
    placing the subsequent transfer sheet onto the prepared subsequent substrate such that the subsequent layer of the image contact the subsequent substrate and is aligned with a desired position on the subsequent substrate;
    applying heat to the first substrate and first transfer sheet sufficient to sublimate the first layer of the image;
    applying heat to the subsequent substrate and subsequent transfer sheet sufficient to sublimate the subsequent layer of the image;
    allowing the first layer of the image to absorb into the prepared first substrate;
    allowing the subsequent layer of the image to absorb into the prepared subsequent substrate;
    curing the first substrate;
    curing the subsequent substrate;
    aligning the first substrate with the subsequent substrate; and
    attaching the first substrate to the subsequent substrate;
    wherein the step of aligning the first substrate with the subsequent substrate is performed before the steps of applying heat to the first substrate and applying heat to the subsequent substrate.

2. A method for applying a three-dimensional image onto a substrate, the method comprising the steps of:
    preparing a first substrate for application of a first layer of an image printed on a first transfer sheet;
    placing the first transfer sheet onto the prepared first substrate such that the first layer of the image contacts the first substrate and is aligned with a desired position on the first substrate;
    preparing a subsequent substrate for application of a subsequent layer of the image printed on a subsequent transfer sheet;
    placing the subsequent transfer sheet onto the prepared subsequent substrate such that the subsequent layer of the image contact the subsequent substrate and is aligned with a desired position on the subsequent substrate;
    applying heat to the first substrate and first transfer sheet sufficient to sublimate the first layer of the image;
    applying heat to the subsequent substrate and subsequent transfer sheet sufficient to sublimate the subsequent layer of the image;
    allowing the first layer of the image to absorb into the prepared first substrate;
    allowing the subsequent layer of the image to absorb into the prepared subsequent substrate;
    curing the first substrate;
    curing the subsequent substrate;
    aligning the first substrate with the subsequent substrate; and
    attaching the first substrate to the subsequent substrate;
    wherein the step of aligning the first substrate with the subsequent substrate is performed before the steps of applying heat to the first substrate and applying heat to the subsequent substrate.

3. The method of claim 2, wherein the first substrate is comprised substantially of a material selected from the group consisting of thermoplastic, thermoset plastic, metal, metal alloys, wood, cellulose material, polymer, synthetic fabric, natural fabric, glass, ceramic, and combinations thereof.

4. The method of claim 2, further comprising the step of concealing imperfections on the first substrate.

5. The method of claim 4, wherein the step of concealing imperfections comprises placing the transfer sheet over imperfections.

6. The method of claim 2, wherein the subsequent substrate is comprised substantially of a material selected from the group consisting of thermoplastic, thermoset plastic, metal, metal alloys, wood, cellulose material, polymer, synthetic fabric, natural fabric, glass, ceramic, and combinations thereof.

7. The method of claim 6, wherein the first substrate and the subsequent substrate are comprised of the same material.

8. The method of claim 6, wherein the first substrate and the subsequent substrate are comprised of different materials.

9. The method of claim 2, wherein aligning the first imaged substrate with the subsequent imaged substrate comprises aligning the first imaged substrate on top of the subsequent imaged substrate such that at least a portion of the subsequent imaged substrate is visible through the first imaged substrate.

10. The method of claim 2, wherein the subsequent substrate is at least partially comprised of a material that is at least partially transparent.

11. The method of claim 2, further comprising the steps of:
    aligning the first imaged substrate with an object such that at least a portion of the object in visible through the first imaged substrate.

12. The method of claim 2, wherein the transfer sheet is at least partially transparent such that at least a portion of the first substrate is visible through the transfer sheet after the transfer sheet has been placed onto the prepared first substrate.

13. The method of claim 2, wherein the first substrate is larger than the transfer sheet such that at least a portion of the first substrate is not covered by the transfer sheet after the transfer sheet has been placed onto the prepared first substrate.

14. The method of claim 1, wherein the steps of applying heat to the first substrate and applying heat to the subsequent substrate are performed concurrently.

15. The method of claim 1, wherein the steps of curing the first substrate and curing the subsequent substrate are performed concurrently.

16. The method of claim 1, wherein the step of attaching the first substrate to the subsequent substrate is performed concurrently with the steps of applying heat to the first substrate and applying heat to the subsequent substrate.

17. The method of claim 16, wherein the step of attaching the first substrate to the subsequent substrate comprises applying heat to the first substrate and the second substrate to bond the first and subsequent substrates to each other.

18. The method of claim 2, wherein the step of preparing a first substrate comprises the step of applying a liquid adhesion material to a surface of the first substrate.

19. The method of claim 2, wherein the steps of applying heat to the first substrate and applying heat to the subsequent substrate are performed concurrently.

20. The method of claim 2, wherein the steps of curing the first substrate and curing the subsequent substrate are performed concurrently.

21. The method of claim 2, wherein the step of attaching the first substrate to the subsequent substrate is performed concurrently with the steps of applying heat to the first substrate and applying heat to the subsequent substrate.

22. The method of claim 21, wherein the step of attaching the first substrate to the subsequent substrate comprises applying heat to the first substrate and the second substrate to bond the first and subsequent substrates to each other.

* * * * *